United States Patent [19]

Eckardt

[11] 4,078,875
[45] Mar. 14, 1978

[54] INJECTION MOLDING

[75] Inventor: Helmut Eckardt, Hilchenbach, Germany

[73] Assignee: Schloemann-Siemag Akt., Dusseldorf, Germany

[21] Appl. No.: 765,048

[22] Filed: Feb. 2, 1977

Related U.S. Application Data

[63] Continuation of Ser. No. 622,052, Oct. 14, 1975, abandoned.

[30] Foreign Application Priority Data

Oct. 19, 1974 Germany .............................. 2449758

[51] Int. Cl.² ................................................ B29F 1/10
[52] U.S. Cl. .............................. 425/217; 264/DIG. 83; 425/557; 425/564; 425/817 R

[58] Field of Search .................... 222/144.5, 145, 525; 264/DIG. 83, 328; 425/4 R, 817 R, 244, 130, 134, 215, 216, 217, 558, 559, 560, 561, 448, 562, 564, 557

[56] References Cited

U.S. PATENT DOCUMENTS

| 3,819,313 | 6/1974 | Josephsen et al. ................... 425/560 |
| 3,947,175 | 3/1976 | Melcher ........................... 425/817 R |
| 3,960,996 | 6/1976 | Baleuski et al. ................. 425/244 X |

*Primary Examiner*—Francis S. Husar
*Assistant Examiner*—Mark Rosenbaum
*Attorney, Agent, or Firm*—Norman S. Blodgett; Gerry A. Blodgett

[57] ABSTRACT

Process and apparatus for injection molding plastic to provide a foamed core with an unfoamed outer skin.

1 Claim, 6 Drawing Figures

INJECTION MOLDING

This application is a continuation of application Ser. No. 622,052, filed Oct. 14, 1975, now abandoned.

BACKGROUND OF THE INVENTION

In the fabrication of molded parts from thermoplastic material containing a blowing agent, it is well-known to inject a measured amount of the plasticized plastic into the cavity of a mold, the amount of plastic injected being smaller than the volume of the cavity.

Since inside the mold cavity only the pressure of the escaping air normally works against the injection of the plastic, the finely-distributed foaming agent in the plasticized plastic mass can expand which causes an apparent volume enlargement of the plasticized plastic and with it the result is a complete filling of the mold cavity.

Considering that the temperature of the mold is below the temperature of the injected plastic, a temperature difference occurs between the core and the surface of the molded part which (together with the pressure of the foaming agent acting inside the core) causes the forming of the outer skin of the molded part. The outer skin has a correspondingly rough outer skin which has to be worked and ground before any final lacquer can be applied, which adds to a considerable price increase for fabrication of molded parts.

A process for the fabrication of molded parts from a thermoplastic mass containing a foaming agent is taught in German Pat. No. 1,504,278, wherein the plasticized mass is pressed directly against an adjustable gas cushion after exiting from the jet of an extruder, the gas escaping under the opposing pressure of the incoming plastic mass. By using this procedure, the surface of the molded part can be improved, but before final finishing usually one or two working steps are necessary. The density of such molded parts is, however, still correspondingly high.

To improve the surface of molded parts made thermoplastic masses containing foaming agent, a process is taught by German Pat. No. 1,181,897, in which, under steam pressure of the foaming agent, an exceeding pressure heats up to the foaming temperature of the plastic mass and under constant pressure the mass is injected into the mold, where its volume is smaller than the volume of the finished molded part. After the mass under pressure is cooled on the surface and forms a smooth surface, the pressure is eliminated by expansion of the mold cavity, so than the inner mass (which is not cooled off) may further expand. The cooled solid surface layer remains on the wall of the enlarged mold and a foamed core is formed. Because of the expansion of the mold, it is quite expensive. This expenditure is still increased when, during injection of the plastic mass, operations have to be performed against gas pressure, since additional tightness of the mold is required. Additionally, molded parts fabricated in a expandible mold have a so-called "breathing" mark, which is generally considered undesirable.

U.S. Pat. No. 3,384,691 shows a procedure for fabrication of plastic molded parts with a foaming core and a non-foamed outer skin, in which a plasticized mass with forming agent is injected into a mold. The volume of the injected mass is equal to the mold volume, so that foaming cannot occur. After a predetermined time necessary to form a non-foamed outer surface, a part of a still plasticized mass is withdrawn from the core of the mold part through an injection canal into an auxiliary storage container designed as a piston-cylinder unit, which provides consequently an enlargement of the mold volume and corresponds to the "breathing" or expansion of a mold. The plastic mass which contains the blowing agent can now foam; it is still plasticized in the core of the molded part and lies within the auxiliary storage container. This known procedure, however, has the disadvantage that the mass which has been withdrawn into the auxiliary container and which foams after the enlargement of the mold volume, cannot be used again for the next injection procedure, since the surface then has streaks. The withdrawn plastic mass has to be considered as waste. This waste is separated from the molded part after its final solidification and after the opening of the mold. With these and other objects in view, as will be apparent to those skilled in the art, the invention resides in the combination of parts set forth in the specification and covered by the claims appended hereto.

SUMMARY OF THE INVENTION

In general, the present invention is concerned with a apparatus for the fabrication of molded plastic parts made with a foamed core and a non-foamed outer skin, wherein a plasticized plastic mass mixed with a foaming or blowing agent corresponding in measured amount to the volume of the mold, is injected through a jet into the mold. After a predetermined certain time for the forming of the non-foamed outer skin, a part of the still plasticized plastic mass is withdrawn into an auxiliary storage by a jet, whereby the still plastic core of the mold part as well as the withdrawn plastic mass are foaming.

More specifically, this invention is based on exploring and improving the known procedure shown in U.S. Pat. No. 3,384,691 for fabrication of molded plastic parts with a foamed core and a non-foamed outer skin, so that the withdrawn foamed plastic mass in the auxiliary storage may be used over again without having a deleterious effect to the surface of the molded part. For the solution of this task, it is suggested according to the present invention to make more dense the foaming plastic mass, which is withdrawn into the auxiliary storage and, during the injection operation, injecting it into the core of the molded part. During this operation, the unfoamed plastic mass is injected into the mold through a ring jet and the foaming plastic mass stored within the auxiliary storage is injected into the mold cavity through a central jet arranged within the ring jet and part of the plastic mass is withdrawn through the central jet into the auxiliary storage.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
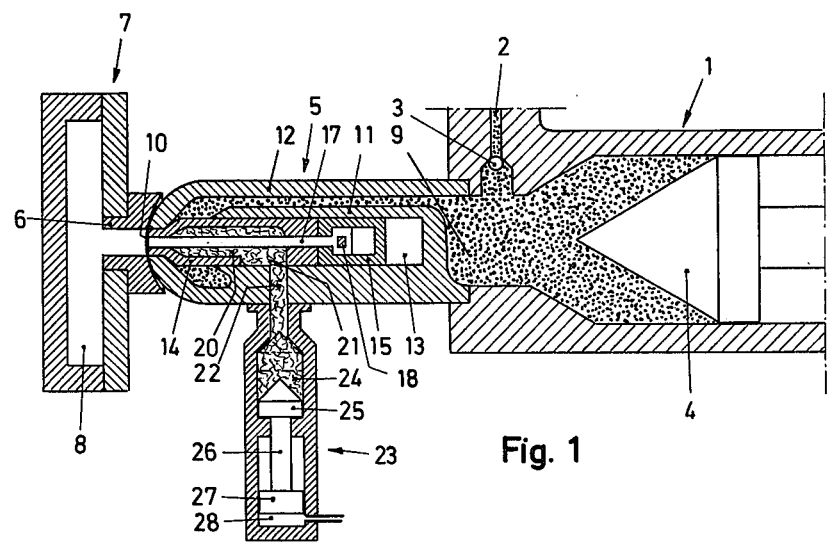
FIG. 1 is a sectional view of a simplified apparatus for the fabrication of molded plastic parts with a foamed core and a non-foamed outer skin.

Referring first to FIG. 1, which best shows the general features of the invention, the apparatus for the fabrication of molded plastic parts with a foamed core and a non-foamed outer skin consists of an injection cylinder 1 (only partially shown) which is connected to a check valve 3 through a canal 2 to a device (not shown) for the plastification of plastic, specifically to an extruder. Within the injection cylinder 1 is arranged a piston 4 which is movable in the axial direction. Furthermore, the injection cylinder 1 carries a removable and exchangable injection head 5 which rests against a bushing 6 on a mold 7 according to the preferred embodiment. The mold 7 provides a simple mold cavity 8.

The injection head 5 is equipped with a centrally-located canal 9 which has a uniform circular cross-section over most of its length and is reduced close to the outlet bushing 6 to a smaller injection opening 10.

Figure 2:
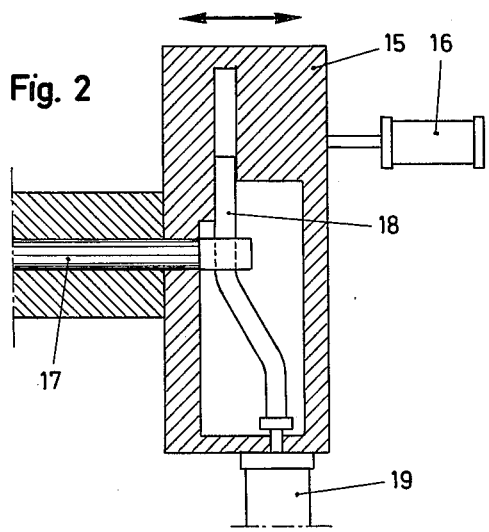
FIG. 2 is a sectional view of a drive for a closure pin to a central jet.
Figure 3:
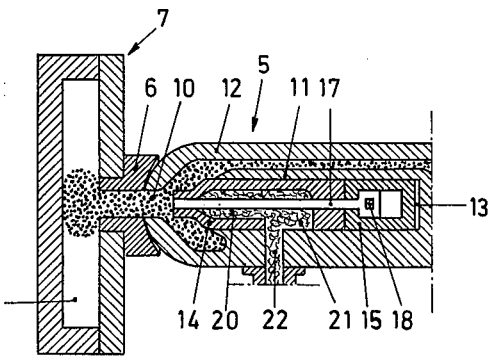
FIG. 3 is a sectional view of the injection apparatus with an opened ring jet.
Figure 4:
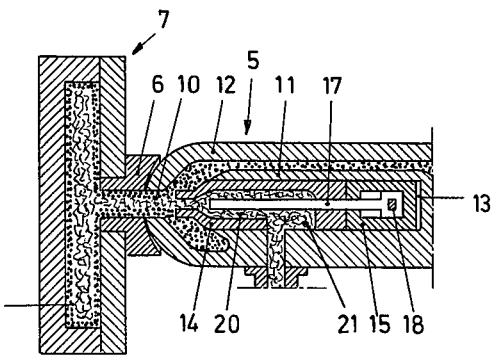
FIG. 4 is a sectional view of the injection apparatus with an opened central jet.
Figure 5:
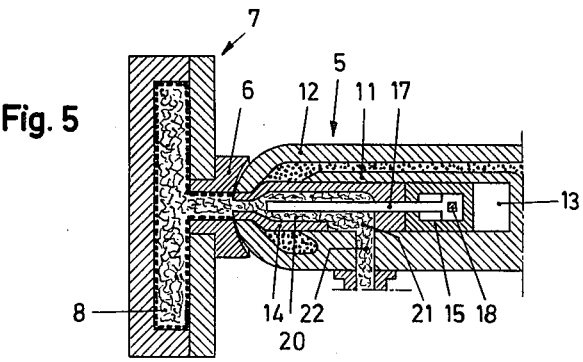
FIG. 5 is a sectional view of the injection apparatus with an opened central jet.

Within the central canal 9 of the injection head 5 is located a projection 11 having a cylindrical cross-section whose diameter is smaller than the diameter of the central canal 9 and which is connected to the housing 12 of the injection head 5 along one longitudinal side. In the example shown, this projection 11 is designed integrally with the housing 12. The projection 11 contains an axially-extending blind hole 13 carrying a sleeve 14 which may be axially displaced. In the base position, the sleeve 14 closes off the transition or ring jet from the central canal 9 to the injection opening 10. The end of the sleeve 14 which penetrates the blind hole 13 engages a lever 15 which extends laterally of the housing 12 of the injection head 5 and is connected to a piston-cylinder unit 16 (FIG. 2). By means of this piston-cylinder unit 16 the sleeve 14 can be moved into the open position (as shown in FIG. 3) and back again. Within the sleeve 14 is located a closure needle 17 in the axial position and displacable. This needle closes the free opening or central jet of the sleeve 14 and may be moved in the axial direction by means of a lever 15 and the guided piston rod 18. The piston rod 18 engages a piston-cylinder unit 19 which serves to displace the rod 18 and with it to move the closure needle 17 into its open position as shown in FIGS. 4 and 5. The piston-cylinder unit 19 is carried by the lever.

Between the inside wall of the sleeve 14 and the closure needle 17 is an annular space 20 which is connected to an auxiliary storage 23 by an opening 21 in the sleeve 14 and through a canal 22 within the projection 11 and the housing 12. The auxiliary storage 23 consists of a cylindrical storage space 24 in which a piston 25 is slidably mounted for movement in the axial direction. To this piston 25 is attached a piston rod 26 which carries on its other end another piston 27 which is slidably supported within a pressure chamber 28. By the admission of pressure into the pressure chamber 28 (for example, oil pressure), the piston 27 and with it the piston 25 is moved out of the position shown in FIG. 1 in the direction to the injection head 5.

During the fabrication of a molded part from plastic containing a blowing agent, the placticized material is moved through the canal 2 and the check valve 3 into the injection cylinder 1. In that way the piston 4 is pushed into the position shown in FIG. 1. As soon as a plastic mass sufficient in amount to fill mold cavity 8 lies within the injection cylinder 1, the piston-cylinder unit 16 is pressurized in such a way that the sleeve 14 along with the closure needle 17 frees the injection opening 10 of injection head 5. With the piston 4, the plastic mass inside the injection cylinder 1 is injected into the mold cavity 8 of mold 7 through the injection opening 10.

During the injection operation, it is necessary that foaming of the injected plastic mass is prevented until the mold cavity 8 is completely filled. This can be achieved, for example, by providing a gas cushion within the mold cavity 8, in a known manner. It is, however, also possible to use an inhibitive blowing agent. Such a blowing agent acts in a retarded manner, so that the mold is first filled before foaming starts.

As soon as the mold cavity 7 is completely filled by the injection cylinder 1, the sleeve 14 is brought from the position shown in FIG. 3 back into the position as shown in FIG. 1 and at the time the injection opening 10 is closed. Because the temperature of mold 8 is below the temperature of the injected plastic mass, the plastic mass within the mold cavity cools off first on the inside wall of mold 7 and, therefor, on the surface of the molded part. Thus, a compact smooth surface of the molded part is obtained. After a predetermined injection time, pressure is admitted to the piston cylinder unit 19 in such a way that the closure pin 17 moves into the position shown in FIG. 5. A connection is thus created between the mold cavity 8 and the storage space 24, which is still empty at this time. The piston takes the position shown in FIG. 1 in dotted lines. The opening of the closure pin 17 results in an enlargement of the volume. The pressure of the injected plastic mass is nearly eliminated thereby, so that the plastic mass within the core of the mold cavity 8, so that the uncooled molded part may now expand by foaming. This foaming plastic mass flows now through the injection opening 10, the annular space 20, the opening 21, and the canal 22 into the auxiliary storage space 23. The piston 25 will be moved back by the foaming mass into the full-line position shown in FIG. 1. In a variation of this design, it is possible to move the piston 25 back by an admission of pressure gas to the piston 27 to draw a part of the plastic mass out of the mold cavity 8; this influences the foaming procedure in a favorable manner. By limiting the end position of piston 25 within storage space 24, an exact regulation of the foaming of the plastic mass inside the core of the mold cavity can be achieved. As soon as the piston 25 in the storage space 24 has reached its predetermined end position, the closure pin 17 will then be brought into the closed position (FIG. 1) by the piston-cylinder unit 19. Inside the mold cavity 8 now exists a molded part which has a non-foamed smooth outer skin and a foamed core. After a predetermined cooling period, the mold 7 is opened and the finished molded part is removed. Thereafter, the mold is again closed.

During the cooling of the molded part insider the mold 7, the foaming plastic mass inside the storage space 24 is compressed by the piston 25 so far that the mass will be about of the same volume as when it was previously taken in, i.e., a smaller volume. At the same time, however, new plastic mass containing blowing agent was introduced into the injection cylinder 1. The stored plastic mass in the injection cylinder 1 is now, however, smaller by the amount of compressed plastic mass within the storage cylinder 23. In the injection operation which follows, the sleeve 14 will be displaced first in an axial direction, so that the plastic mass present within the injection cylinder may enter the mold through the central canal 9 and through the injection opening 10 of the injection head 5. During the procedure of injecting this plastic mass, the closure pin 17 will now be moved into its open position (FIG. 4), so that at the same time the plastic mass in the injection cylinder 1 and the plastic mass in the auxiliary storage space 24 may flow into the mold cavity 8. The plastic flowing through the sleeve 6 into the mold cavity 8 at this time consists of a cover of plastic which contains a blowing agent but which is not yet foaming and of a core of plastic wich is already foaming. The design of the injection head 5 assures that the foaming plastic mass from the auxiliary storage space 24 cannot reach the walls of the mold 7. This plastic mass (which has foamed but is again made dense) lies, therefore, only within the core, that is to say, within the inner area of the mold cavity 8. It is advantageous that the auxiliary storage space 24 be emptied before the injection cylinder is emptied. As soon as the injection cylinder 1 and the auxiliary storage 23 are emptied and consequently the mold cavity 8 completely filled, the sleeve 14 as well as the closure pin 17 are moved back into the position shown in FIG. 1. After the forming of a non-foamed, smooth outer skin of the molded part has been accomplished, the closure pin 17 is opened up again (FIG. 5). In that way an enlargement of the mold volume is created and pressure in the injected plastic mass is mostly eliminated. In that way, the uncooled plastic mass present within the core of the mold cavity 8 and of the molded part can now expand, i.e., foam and flow back again into the storage space 24. The piston 27 within the pressure space 28 is then relieved. As soon as the desired foaming process (in which a part of the injected plastic from the injection cylinder 1 also takes part) is ended, the closure pin 17 is returned into the position shown in FIG. 1. After cooling the molded part, the mold 7 will be opened and the molded part removed. During the next injection cycle, plastic mass again is injected into the mold cavity 8 from the injection cylinder 1 and the auxiliary storage 23. This operation insures that the plastic mass withdrawn into the auxiliary storage for the foaming procedure is not lost, but is used again for the following injection cycle as part of the so-called "core mass."

A variation of the above described construction consists of interrupting the injection operation of the plastic mass from the injection cylinder 1 during the injection operation of plastic mass from the auxiliary storage 23. To make sure that the plastic mass within the canal 6 remains as long as possible in its elastic state and so cannot hinder the foaming process, the sleeve 6 is equipped with a heating and cooling circuit. The arrangement of the auxiliary storage 23 on the injection head 5 makes it possible to revamp previous designs of injection apparatus by exchanging the injection head to one using the present invention. The auxiliary storage 23 has sufficient volume to carry up to 50% of the volume of the mold cavity. By a proper design of the injection head 5, it is possible to fabricate molded parts without lugs. In the area of the lug cross-section, however, the finished molded part has a foamed structure.

By varying this design, it is possible, after the foaming of the plastic mass within the mold cavity 8, to bring the sleeve 14 back for a short time to the position shown in FIG. 3 and to inject a small amount of plastic mass from the injection cylinder 1 into the mold cavity. In that way, unfoamed plastic can enter the canal 6 and the finished molded part then is provided in this area with a non-foamed outer skin.

Figure 6:
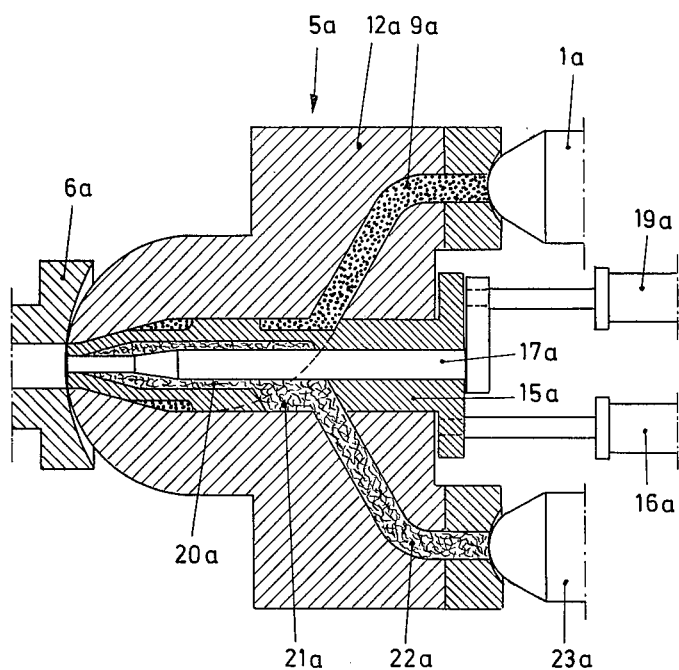
FIG. 6 is a sectional view of a modified form of an injection apparatus.

FIG. 6 of the drawing shows another design of the injection head 5a where its parts, as far as they agree with the parts of the injection head 5, have similar reference numbers, but with the additional letter "a". The essential difference consists in the fact that the injection cylinder 1a and the auxiliary storage 23a are arranged parallel to one another. This requires a proper re-design of the canals 9a and 22a. The sleeve 14a is directly guided within the housing 12a of the injection head 5a.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:

1. Injection molding apparatus for performing an injection cycle in the molding of bodies consisting of a plurality of layers, including a foamed thermoplastic core and a non-foamed thermoplastic skin, by injecting foaming thermoplastic material into a hollow molding tool, comprising:
    a. an injection head having a mold, and an axial first bore,
    b. an injection cylinder mounted on the head and operatively associated with said mold to perform an injection movement to deliver a foaming thermoplastic material to said mold,
    c. a ring jet closing sleeve lying within the said first bore of the head and axially movable within the first bore and formed with a second axial bore,
    d. a closure needle mounted in the head and axially movable within the second bore,
    e. a ring jet defined by the injection head and the closing sleeve,
    f. a central jet defined by the closing sleeve and the closure needle,
    g. a storage chamber formed in the head to receive excess thermoplastic material from said mold during a foaming portion of the injection cycle,
    h. a first conduit formed in the head to carry material from the injection cylinder to the ring jet,
    i. a second conduit formed in the head to carry material from the storage chamber to the central jet, and
    j. an actuator connected to the storage chamber to compress the stored material and later to inject it through the central jet before the injection cylinder has completed its injection movement, the storage chamber extending laterally away from the injection head and the chamber consisting of a cylinder and piston for receiving, compressing, and injecting the material, and also consisting of a separate coaxial cylinder and piston constituting the said actuator.

* * * * *